(12) United States Patent
Ogawa

(10) Patent No.: US 10,259,050 B2
(45) Date of Patent: Apr. 16, 2019

(54) DRILL AND METHOD OF MANUFACTURING MACHINED PRODUCT USING THE SAME

(71) Applicant: KYOCERA CORPORATION, Kyoto-shi, Kyoto (JP)

(72) Inventor: Hiroshi Ogawa, Omihachiman (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/329,604

(22) PCT Filed: Jul. 22, 2015

(86) PCT No.: PCT/JP2015/070841
§ 371 (c)(1),
(2) Date: Jan. 27, 2017

(87) PCT Pub. No.: WO2016/017500
PCT Pub. Date: Feb. 4, 2016

(65) Prior Publication Data
US 2017/0225241 A1    Aug. 10, 2017

(30) Foreign Application Priority Data
Jul. 29, 2014    (JP) .................. 2014-153636

(51) Int. Cl.
*B23B 51/02* (2006.01)
(52) U.S. Cl.
CPC ........ *B23B 51/02* (2013.01); *B23B 2226/275* (2013.01); *B23B 2251/04* (2013.01);
(Continued)

(58) Field of Classification Search
CPC ............ B23B 2251/48; B23B 2251/08; B23B 2251/12; B23B 2251/14; B23B 51/02
See application file for complete search history.

(56) References Cited

U.S. PATENT DOCUMENTS 2,322,894 A * 6/1943 Stevens ............... B23B 51/02
                                                         408/230
2,552,463 A * 5/1951 Searles ............... B23Q 11/10
                                                         285/190
2,966,081 A * 12/1960 Kallio ............... B23B 51/02
                                                         408/230
(Continued)

FOREIGN PATENT DOCUMENTS

DE            537176 C * 10/1931 ........... B23B 51/02
DE    102011000882 A1 * 8/2012 ........... B23B 51/02
(Continued)

OTHER PUBLICATIONS

The extended European Search Report based on Application No. 15827462.1 dated Feb. 8, 2018, 9 pages.
(Continued)

*Primary Examiner* — Daniel W Howell
(74) *Attorney, Agent, or Firm* — Viering, Jentschura & Partner MBB

(57) ABSTRACT

A drill includes a bar-shaped drill body, a major cutting edge which is located at a front end of the drill body and has a straight-line region in a front view, a rake surface located along the major cutting edge, and a chip discharge flute being extended spirally around a rotation axis of the drill body in a direction from the rake surface toward a rear end of the drill body. The rake surface has a flat region located along the straight-line region.

20 Claims, 13 Drawing Sheets

(52) U.S. Cl.
CPC ....... *B23B 2251/08* (2013.01); *B23B 2251/14* (2013.01); *B23B 2251/40* (2013.01); *B23B 2251/48* (2013.01)

(56) References Cited

U.S. PATENT DOCUMENTS

| | | | |
|---|---|---|---|
| 3,199,381 A * | 8/1965 | Mackey | B23B 51/02 |
| | | | 408/144 |
| 3,387,511 A | 6/1968 | Ackart, Sr. et al. | |
| 4,120,601 A * | 10/1978 | Benjamin | B23B 51/0009 |
| | | | 408/223 |
| 5,387,059 A * | 2/1995 | Borzemsky | A61C 3/02 |
| | | | 408/226 |
| 7,237,986 B2 * | 7/2007 | Anjanappa | B23B 51/02 |
| | | | 408/227 |
| 9,004,826 B2 * | 4/2015 | Wedner | B23B 51/009 |
| | | | 408/223 |

FOREIGN PATENT DOCUMENTS

| | | | | |
|---|---|---|---|---|
| DE | 102014004373 A1 | * | 10/2015 | ............ B23B 51/02 |
| EP | 2286945 A1 | | 2/2011 | |
| GB | 172820 A | * | 12/1921 | ............ B23B 51/00 |
| GB | 940206 A | * | 10/1963 | ............ B23B 51/02 |
| JP | 56-076314 A | | 6/1981 | |
| JP | 2007144526 A | | 6/2007 | |
| JP | 2008142834 A | | 6/2008 | |
| JP | 2011093059 A | * | 5/2011 | |
| KR | 20080111648 A | * | 12/2008 | ........... B23B 51/009 |
| WO | 2010086988 A1 | | 8/2010 | |

OTHER PUBLICATIONS

International Search Report (Form PCT/ISA/210) dated Sep. 29, 2015 and issued for PCT/JP2015/070841.

* cited by examiner

US 10,259,050 B2

DRILL AND METHOD OF MANUFACTURING MACHINED PRODUCT USING THE SAME

RELATED APPLICATIONS

The present application is a national stage entry according to 35 U.S.C. § 371 of PCT application No.: PCT/JP2015/070841 filed on Jul. 22, 2015, which claims priority from Japanese application No.: 2014-153636 filed on Jul. 29, 2014, and is incorporated herein by reference in its entirety.

TECHNICAL FIELD

The present invention relates to a drill used for a cutting process, and a method of manufacturing a machined product.

BACKGROUND ART

As a drill used for a cutting process of a workpiece, such as a metal member, a drill described in Patent Document 1 has conventionally been known. In the drill described in Patent Document 1, a bit-shaped cutting edge (major cutting edge) formed by an S-shaped curve in a side view, and a rake surface located along the cutting edge are formed by grinding a lead flute (chip discharge flute) with the use of a drum type grinding wheel or a disc type grinding wheel.

PRIOR ART DOCUMENT

Patent Document

Patent Document 1: Japanese Unexamined Patent Publication No. 2007-144526

SUMMARY OF THE INVENTION

Means for Solving the Problem

A drill according to a first embodiment includes a bar-shaped drill body, a major cutting edge which is located at a front end of the drill body and has a straight-line region in a front view, a chip discharge flute which is located along an outer periphery of the drill body and is extended spirally around a rotation axis of the drill body in a direction from behind the major cutting edge toward a rear end of the drill body, and a major rake surface located between the major cutting edge and the chip discharge flute and along the major cutting edge. The major rake surface has a flat region located along the straight-line region.

A drill according to a second embodiment includes a bar-shaped drill body, a major cutting edge being located at a front end of the drill body, a chip discharge flute which is located along an outer periphery of the drill body and is extended spirally around a rotation axis of the drill body in a direction from the major cutting edge toward a rear end of the drill body, and a major rake surface located between the major cutting edge and the chip discharge flute and along the major cutting edge. The major rake surface has an isogonal region whose major rake angle is constant.

A method of manufacturing a machined product includes the step of rotating the drill around the rotation axis, the step of bringing a pair of the major cutting edges of the drill being rotated into contact with a workpiece, and the step of separating the drill from the workpiece.

EMBODIMENTS FOR CARRYING OUT THE INVENTION

<Drill>

Figure 1:
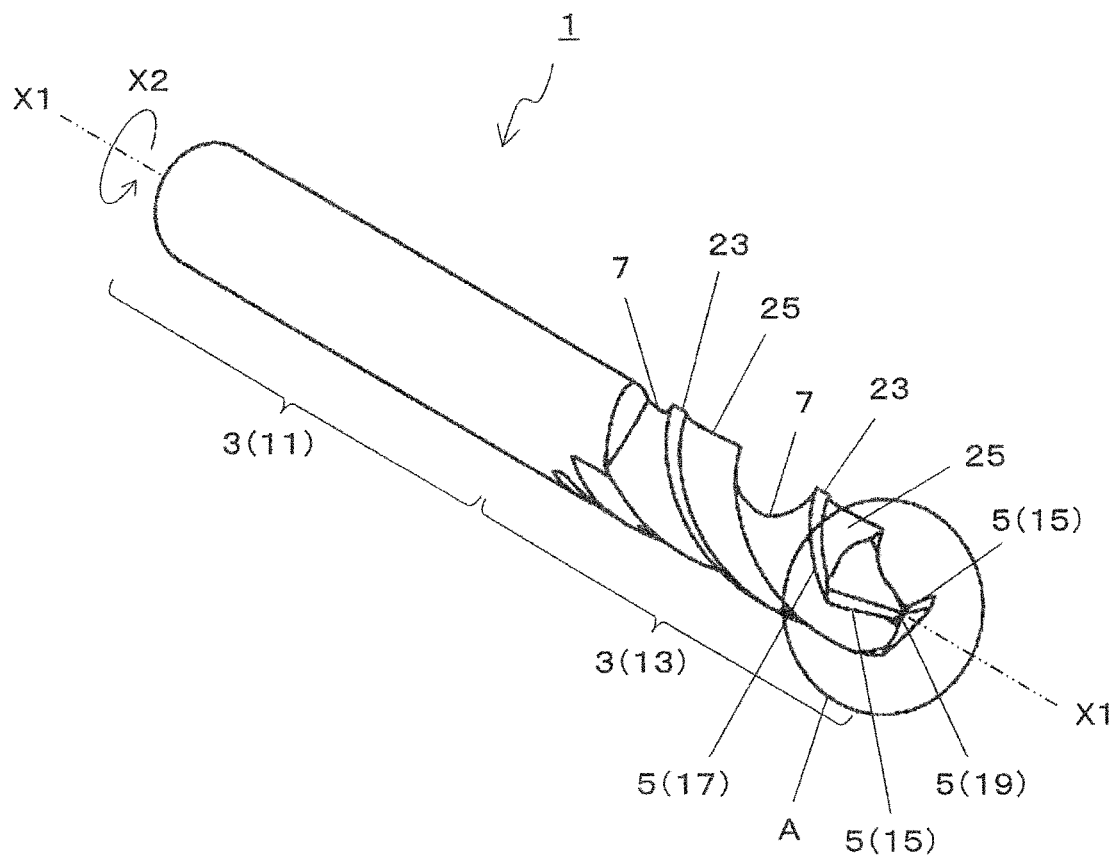
FIG. 1 is a perspective view that shows a drill according to an embodiment of the present invention.

A drill 1 of the present embodiment is described in detail below with reference to the drawings. For the sake of description, the drawings referred to in the following show, in a simplified form, only main members from among structural members of the present embodiment, which are necessary for describing the present invention. Hence, the drill of the present invention is capable of including any optional structural member not shown in the drawings referred to in the present description. Sizes of the members in each of the drawings are not ones which faithfully represent the actual structural members and size ratios of these members.

As shown in FIGS. 1 to 10, the drill 1 of the present embodiment includes a drill body 3, a cutting edge 5, a chip discharge flute 7, and a major rake surface 9.

As shown in FIG. 1, the drill body 3 has a rotation axis X1 and is made into a bar shape extending along the rotation axis X1. The drill body 3 rotates around the rotation axis X1 during use thereof. The drill body 3 of the present embodiment includes a holding section 11 called shank, and a cutting section 13 called body. The holding section 11 is a section configured to be held by, for example, a spindle to be rotated in a machine tool (not shown). Accordingly, the holding section 11 is designed according to the shape of the spindle of the machine tool. The cutting section 13 is located close to a front end of the holding section 11. The cutting section 13 is a section configured to come into contact with a workpiece and play a major role in the cutting process of a workpiece. A rotation direction of the drill body 3 is indicated by arrow X2.

As a material for the drill body 3, there are, for example, cemented carbide containing WC (tungsten carbide), containing Co (cobalt) as a binder, and containing additives, such as TiC (titanium carbide), TaC (tantalum carbide), or $Cr_3C_2$ (chrome carbide), as needed, cermet, ceramics, or metals, such as stainless steel, high-speed steel, and titanium.

Figure 3:
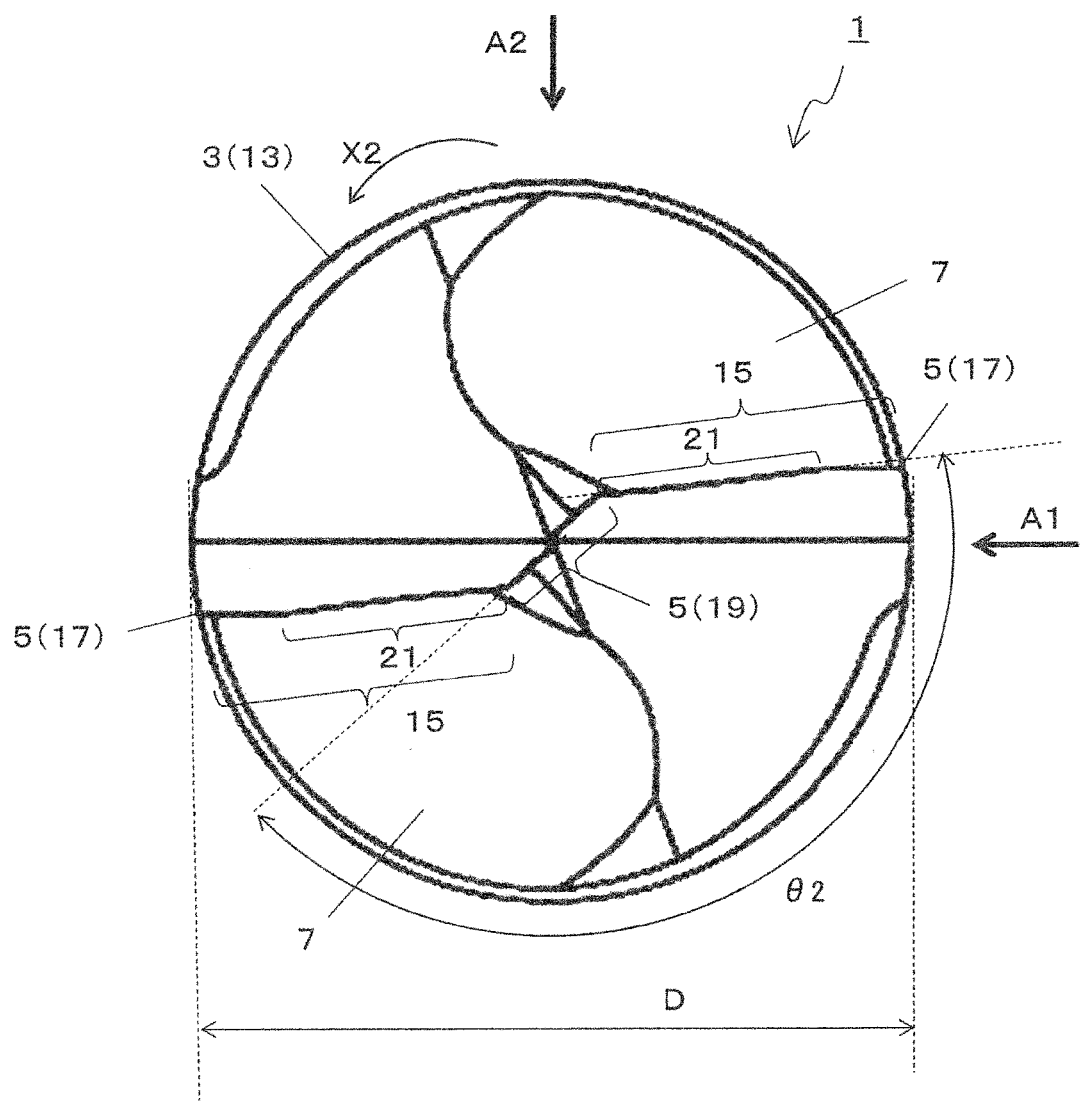
FIG. 3 is a front view taken from the direction of a front end in the drill shown in FIG. 1.

As shown in FIG. 3, an outer diameter D of the cutting section 13 is settable to, for example, 0.05-40 mm. A length of the cutting section 13 in a direction along the rotation axis X1 is settable to approximately 1.5-25 Dmm.

Figure 2:
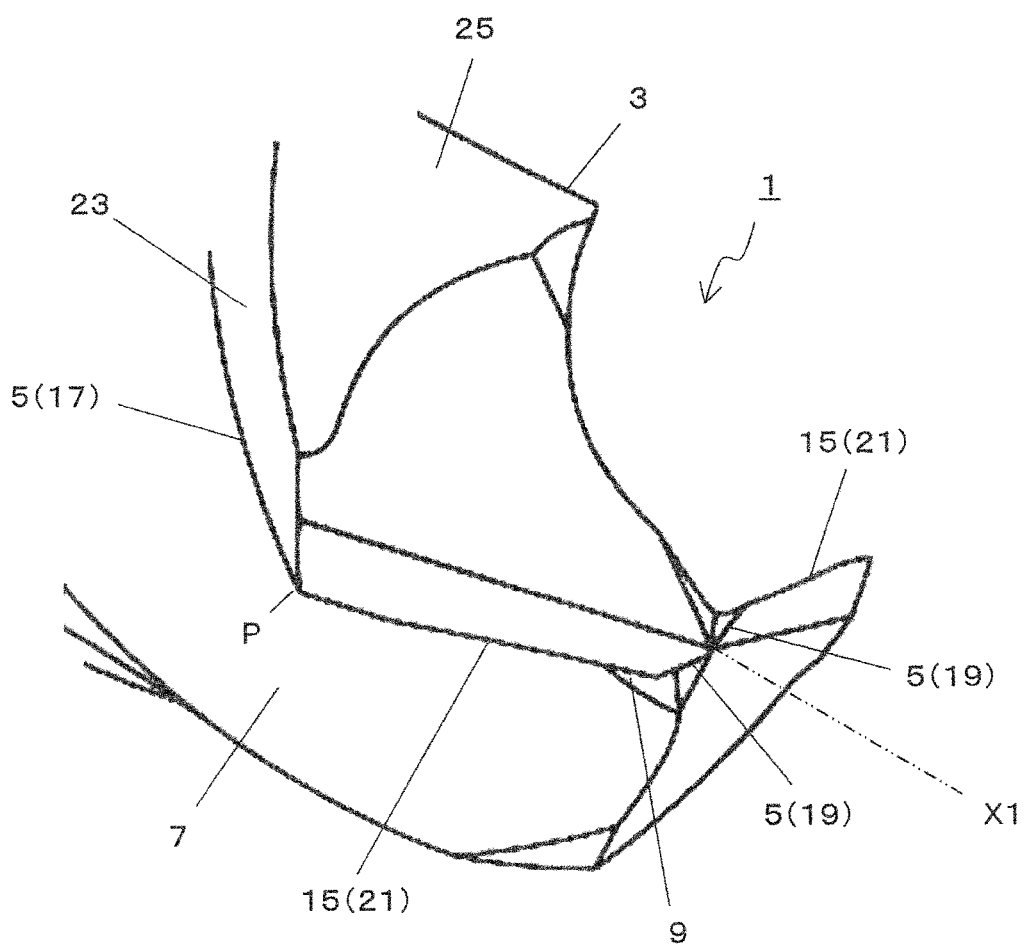
FIG. 2 is an enlarged perspective view of a region A in the drill shown in FIG. 1.

As shown in FIGS. 2 and 3, the cutting edge 5 has a pair of major cutting edges 15, a pair of minor cutting edges 17, and a connection edge 19.

Figure 4:
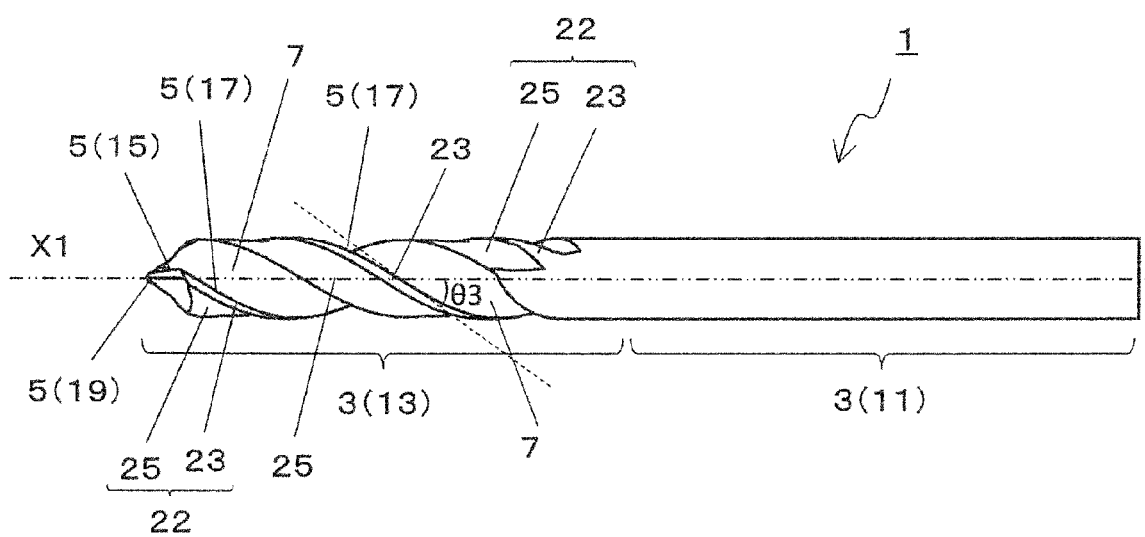
FIG. 4 is a side view taken from a direction A1 in the drill shown in FIG. 3.
Figure 5:
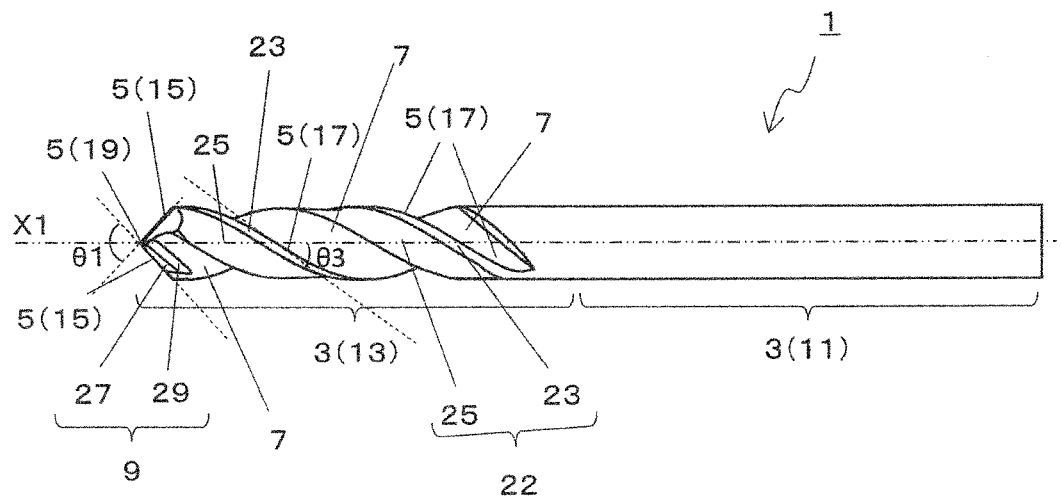
FIG. 5 is a side view taken from a direction A2 in the drill shown in FIG. 3.

The major cutting edges 15 are located at the front end of the drill body 3, namely, a front end portion of the cutting edge section 13. The front end of the drill body 3 is a section that is brought into contact with the workpiece and is configured to cut the workpiece by the major cutting edges 15. The front end of the drill body 3 has a conical shape whose width in a direction orthogonal to the rotation axis X1 decreases toward the front end thereof. Here, a point angle θ1 formed by the major cutting edges 15 in a side view of the front end having the conical shape is set to approximately 60-140° as shown in FIG. 5. FIG. 4 shows a state in which the drill 1 of FIG. 5 is already rotated 90°.

As shown in FIG. 3, the major cutting edges 15 are located from near the rotation axis X1 to an outer peripheral end, and are respectively located at positions at which both have 180°-rotational symmetry about the rotation axis X1 in a front view of the drill body 3 from the direction of the front end thereof. The drill 1 of the present embodiment having the pair of major cutting edges 15 is capable of improving cutting balance than the case of having the single major cutting edge 15. In the present description, the term "front view" denotes viewing the drill 1 from the direction of the front end thereof and along the rotation axis X1.

The connection edge 19 is located toward the frontmost of the front end of the drill body 3 as shown in FIG. 5. The connection edge 19 is connected to the major cutting edges 15 in the front view of the drill body 3 as shown in FIG. 3. The major cutting edges 15 are therefore separated from each other with the connection edge 19 interposed therebetween. The front end of the drill body 3 is provided with a portion after subjected to a thinning process, which is intended to particularly decrease thickness of a shaft core of the drill 1, so-called web. The connection edge 19 is a region of the cutting edge which includes the portion subjected to the thinning process and functions as so-called chisel edge. A chisel angle θ2 of the chisel edge is set to approximately 130-170°.

The major cutting edges 15 are respectively inclinedly located so as to approach each other at the front end side with respect to the rotation axis X1 in order to enhance cutting performance. Each of the major cutting edges 15 has a straight-line region 21 that has a straight-line form in the front view.

The minor cutting edges 17 are respectively connected to an outer peripheral end P of the major cutting edges 15, and are extended toward a rear end of the drill body 3 as shown in FIG. 2. The minor cutting edges 17 are located only a predetermined length from the outer peripheral end P.

The pair of chip discharge flutes 7 (hereinafter also referred to simply as "flutes 7") is located along the outer periphery of the drill body 3 as shown in FIGS. 1 to 10. The flutes 7 are configured to discharge therethrough chips of the workpiece after being cut by the major cutting edges 15. Therefore, the flutes 7 are located closer to the rear end of the drill body 3 than the major cutting edges 15, and are extended toward the rear end of the drill body 3. Here, the flutes 7 are extended spirally around the rotation axis X1. The flutes 7 are located only in the cutting section 13 of the drill body 3, but are not located in the holding section 11 in order that the drill body 3 is stably held by the machine tool.

Helix angles θ3 of the discharge flutes 7 are designed to be identical to each other as shown in FIGS. 4 and 5. The helix angles θ3 of the discharge flutes 7 are also designed to be constant from their respective front ends to their respective rear ends, but are not particularly limited to this configuration. For example, the discharge flutes 7 may be configured so that the helix angle at the front end is larger than the helix angle at the rear end.

The helix angle in the present description denotes an angle formed by a leading edge of land that is a ridgeline on which the discharge flutes 7 and a margin 23 intersect each other, and a virtual straight line that passes through a point on the leading edge of land and is parallel to the rotation axis X1.

An outer peripheral surface of the cutting section 13 is a surface except for regions corresponding to the pair of flutes 7, and the like, and a region located between the flutes 7 corresponds to a land surface 22. The land surface 22 has the margin 23 adjacent to the minor cutting edge 17, and a body clearance 25 adjacent to the margin 23. In other words, the margin 23 is located adjacent in the reverse rotation direction of the minor cutting edge 17 (the reverse rotation direction indicated by X2), and the body clearance 25 is located adjacent in the reverse rotation direction of the margin 23. A rotation direction X2 is a direction in which the major cutting edge 15 goes toward the flute 7 adjacent thereto. The reverse rotation direction is a direction in which the major cutting edge 15 goes toward the land surface 22 adjacent thereto.

Figure 10:
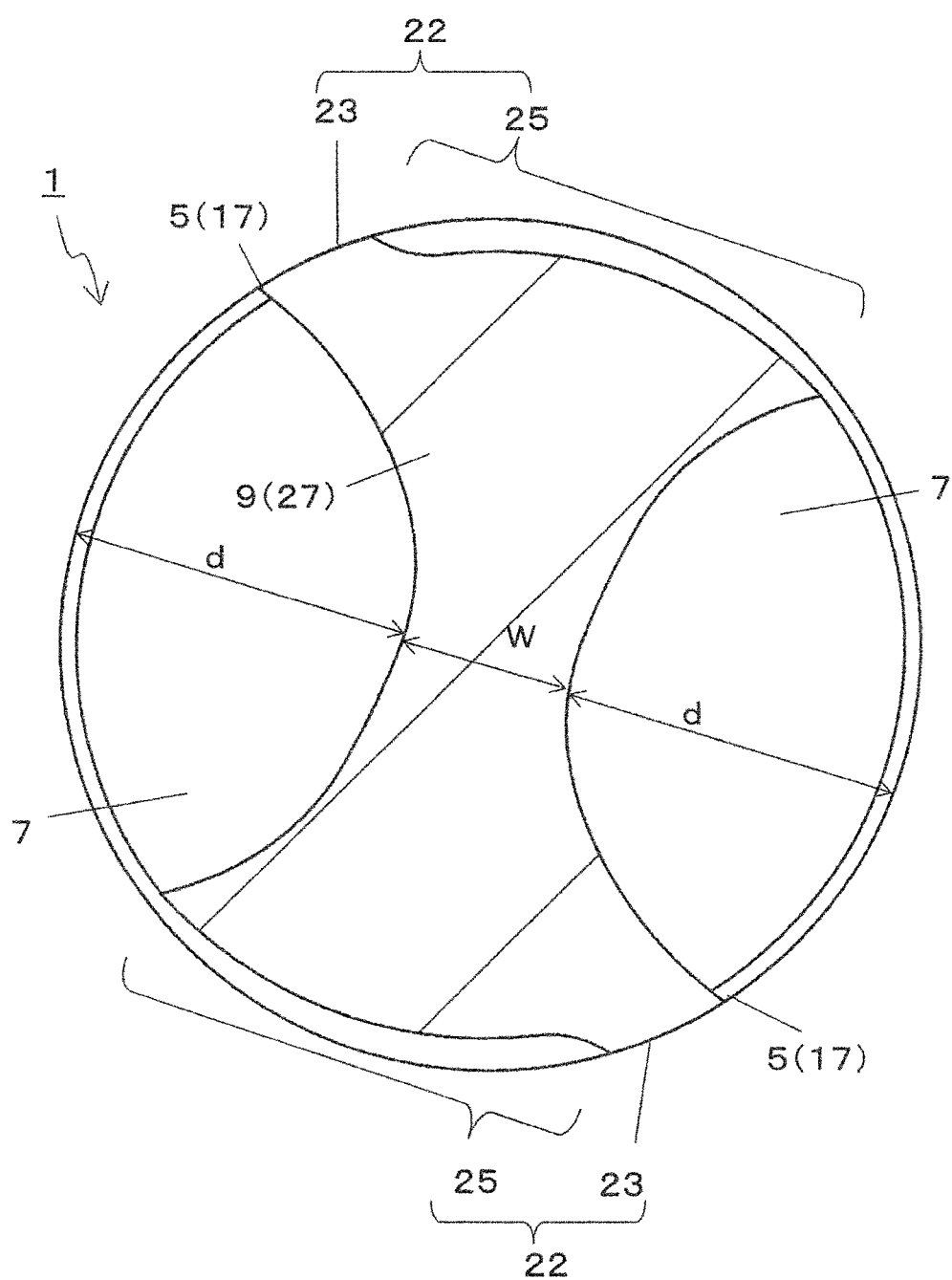
FIG. 10 is a sectional view taken along line B4-B4 in the drill shown in FIG. 6.

The margin 23 has a circular arc form located on an identical circle in a cross section that includes the rotation axis X1 and is orthogonal to the rotation axis X1 as shown in FIG. 10. A diameter of the identical circle corresponds to the outer diameter of the cutting section 13. The body clearance 25 is a surface intended to avoid friction between the outer periphery of the drill body 3 and a processing surface during the cutting process. Therefore, the body clearance 25 has a shorter distance from the rotation axis X1 than the margin 23 so as to ensure a clearance with respect to the processing surface.

As shown in FIG. 10, a depth "d" of each of the flutes 7 is settable to approximately 10-40% of the outer diameter of the cutting section 13. Here, the depth "d" of the flutes 7 denotes a value obtained by subtracting a distance between a bottom of the flute 7 and the rotation axis X1 from a radius of the drill body 3 in the cross section orthogonal to the rotation axis X1. Therefore, a core thickness W, which is a diameter of a web thickness indicated by a diameter of an inscribed circle in the cross section orthogonal to the rotation axis X1 in the cutting section 13, is set to approximately 20-80% of the outer diameter D of the cutting section 13. Specifically, when the outer diameter D of the cutting section 13 is 10 mm, the depth "d" of the flutes 7 is settable to approximately 1-4 mm.

As shown in FIGS. 2 and 3, the pair of minor cutting edges 17 constituting a part of the cutting edge 5 is located at the leading edge that is a ridgeline on which the discharge flutes 7 and the margin 23 intersect with each other. The minor cutting edges 17 are usable for cutting fibers that remain without being cut when a workpiece composed of a fiber composite material is cut by the major cutting edges 15. The pair of minor cutting edges 17 need not be located over the entirety of the leading edge. The minor cutting edges 17 need to be located at least near a tip of the leading edge so that at least the minor cutting edges 17 are respectively connected to the major cutting edges 15.

Figure 6:
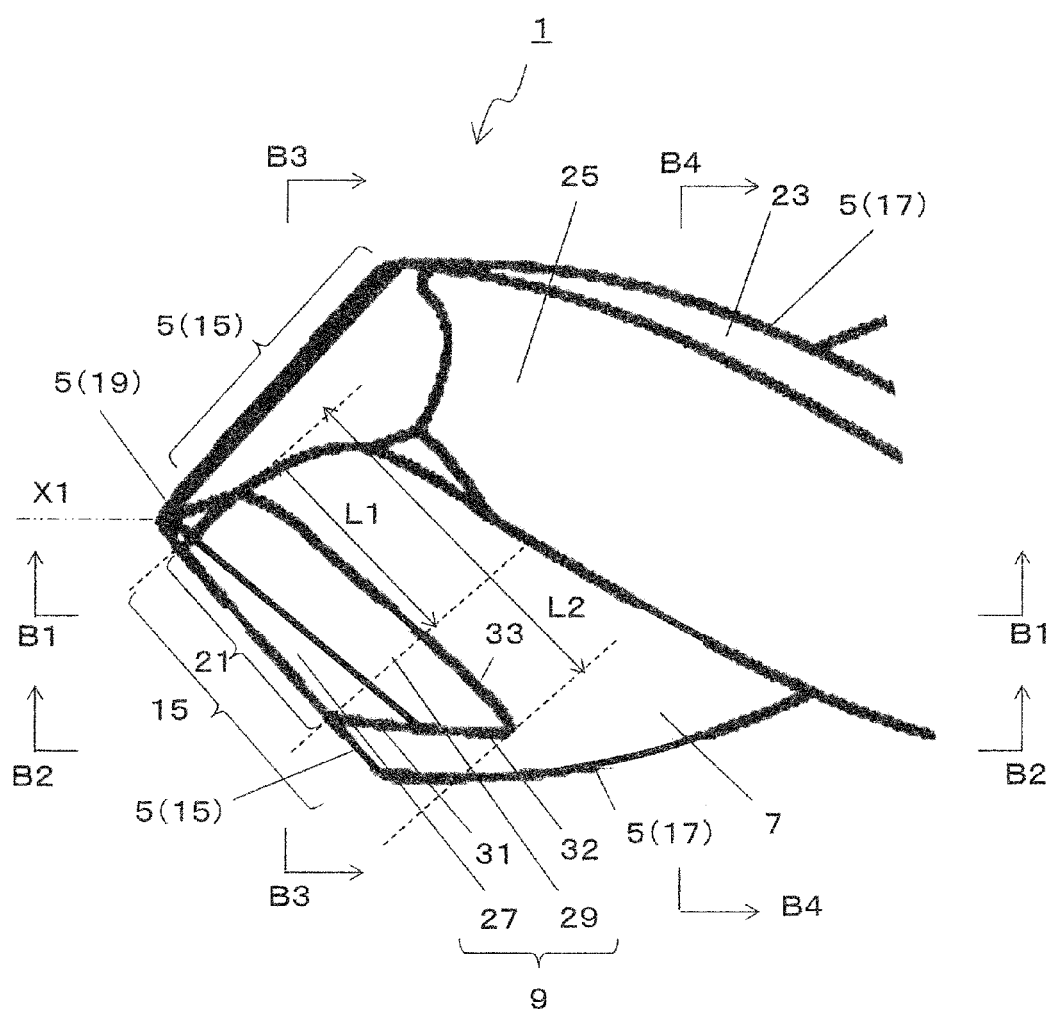
FIG. 6 is an enlarged side view of a front end part in the drill shown in FIG. 5.
Figure 7:
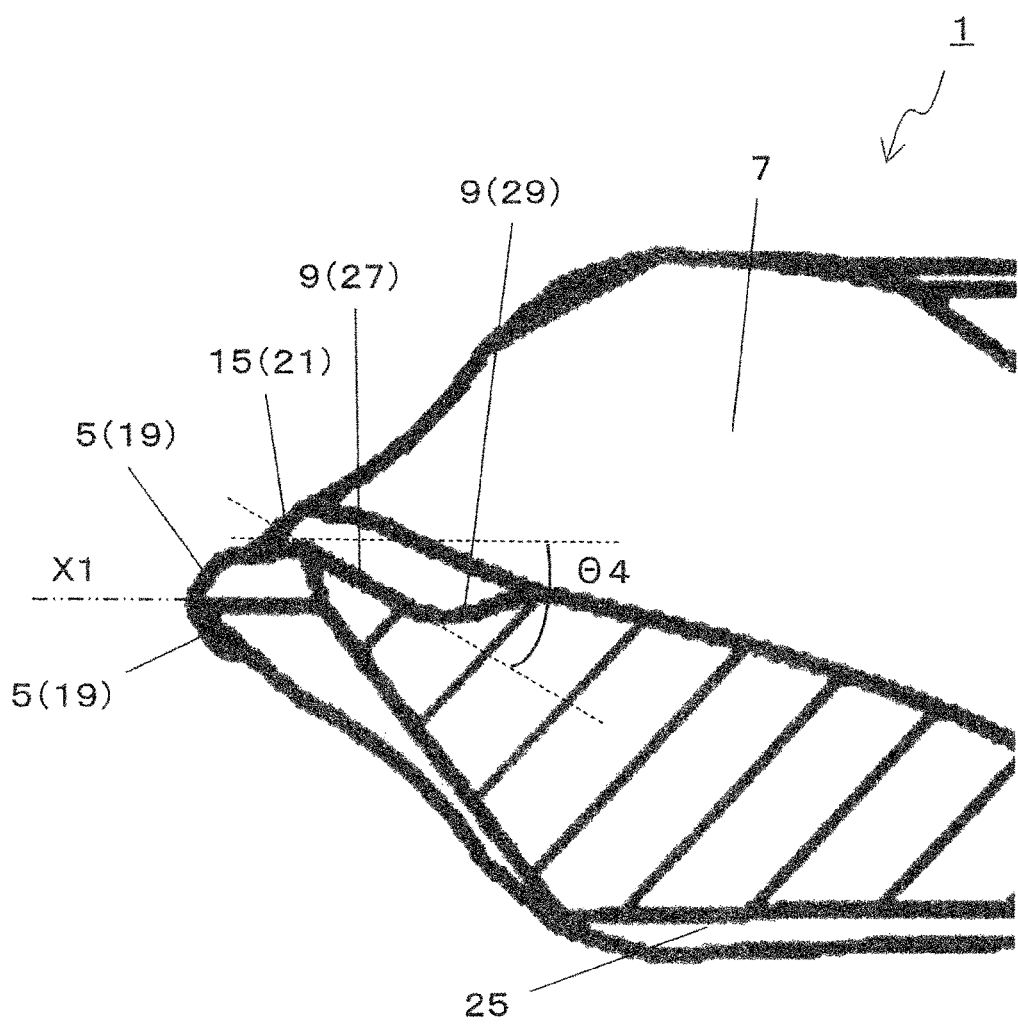
FIG. 7 is a sectional view taken along line B1-B1 in the drill shown in FIG. 6.
Figure 8:
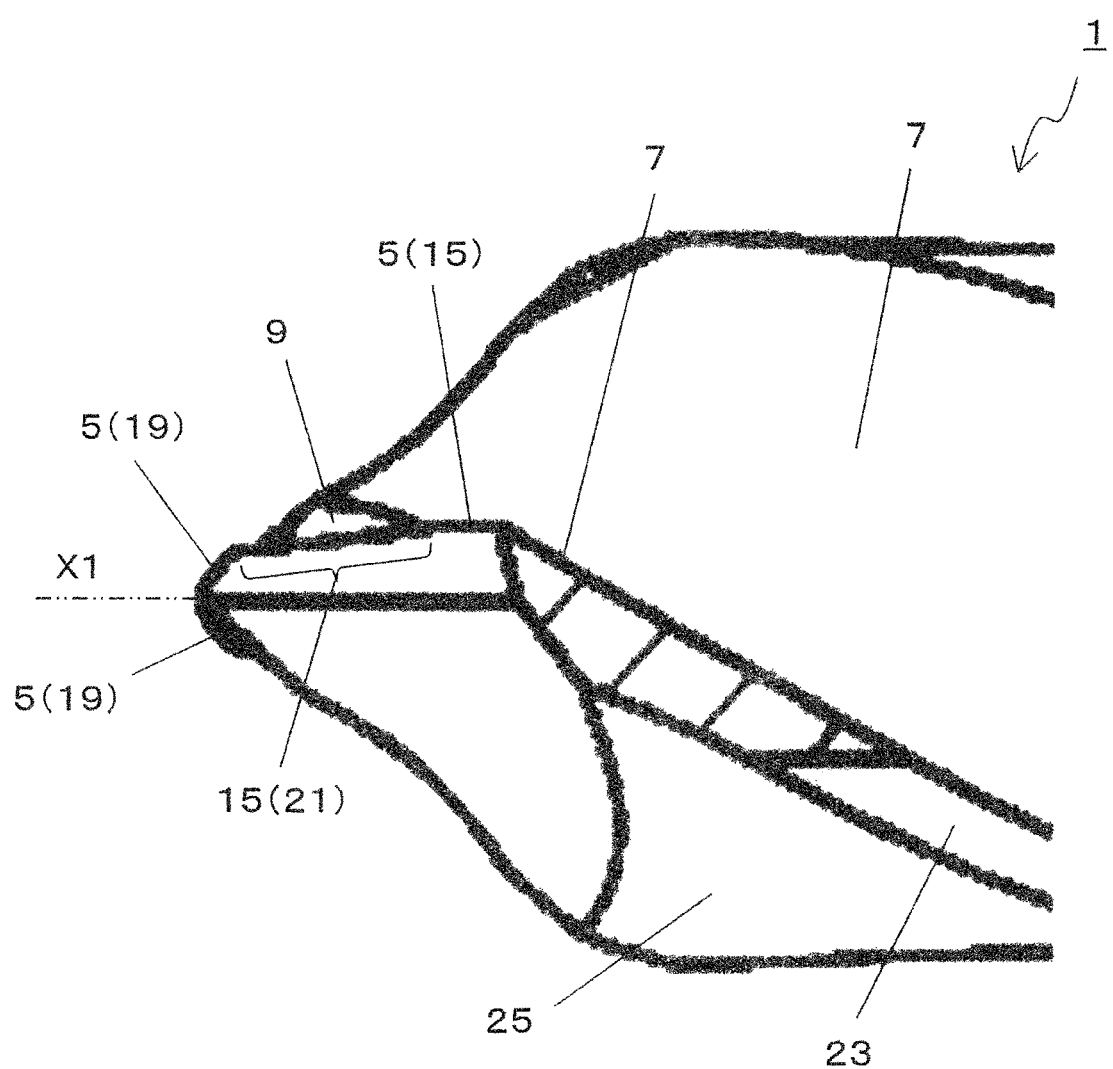
FIG. 8 is a sectional view taken along line B2-B2 in the drill shown in FIG. 6.
Figure 9:
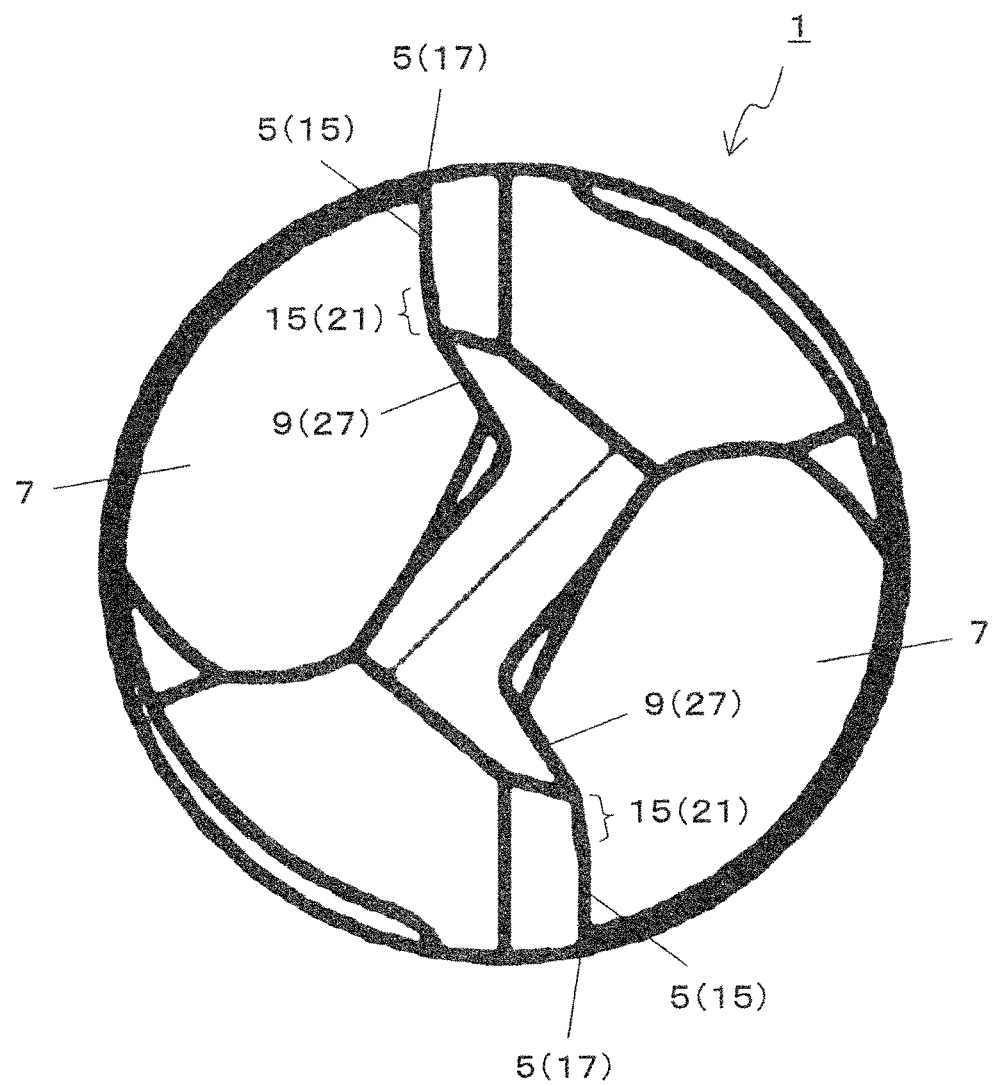
FIG. 9 is a sectional view taken along line B3-B3 in the drill shown in FIG. 6.

Major rake surfaces 9 are respectively located between the major cutting edge 15 and the flute 7, and along the major cutting edges 15 as shown in FIG. 6. The major rake surfaces 9 function to guide the chips after being cut by the major cutting edges 15 toward the flutes 7. As shown in FIG. 7, the major rake surfaces 9 have a more recessed shape than the major cutting edges 15 and the flutes 7. That is, the major rake surfaces 9 are located closer to the reverse rotation direction than the major cutting edges 15 and the flutes 7.

Each of the pair of the major rake surfaces 9 has a flat region 27 and a recessed region 29 as shown in FIG. 6. The flat region 27 is located along the straight-line region 21 of the major cutting edge 15, and has a flat planar form. The recessed region 29 is located between the flat region 27 and the flute 7. The recessed region 29 is connected to the flute 7 by being connected to a terminal portion of the flat region 27 which is close to the rear end of the drill body 3. In other words, the recessed region 29 is more recessed than the flute 7, and is located closer to the reverse rotation direction than the flute 7.

The straight-line region 21 on the major cutting edge 15 has the straight line form, and the flat region 27 on the major rake surface 9 has the flat planar form, thus minimizing the difference in rake angle at each position within the flat region 27. This contributes to improving cutting performance of the major cutting edges 15 in the vicinity of the rotation axis X1 in the straight-line region 21, thus leading to a stable cutting resistance when the workpiece is cut by the straight-line region 21. This contributes to reducing especially occurrences of interlayer separation (delamination) and fibers that remain without being cut (uncut fibers), or the like, during a cutting process of a CFRP (carbon fiber reinforced plastic) material. It is therefore possible to obtain a well-finished state in a cutting process of a workpiece containing a CFRP (carbon fiber reinforced plastic) material by using the drill 1 of the present embodiment. The workpiece is not limited to one which contains a CFRP material. Satisfactory cutting performance is ensured even for metals, ceramics, or the like. The difference in rake angle at each position within the straight-line region 21 is 10° or less, preferably 3° or less.

The CFRP material has such a structure that layers called prepregs containing carbon fibers are laminated into a multilayer. Therefore, the cutting the CFRP material is apt to cause the delamination, specifically separation between the prepregs, and the uncut fibers, specifically bendable fibers that bend and remain without being cut. The delamination and the uncut fibers are more apt to occur at a region of the cutting edge 5 which is closer to the rotation axis X1. This is because cutting speed becomes lower toward the region of the cutting edge 5 which is closer to the rotation axis X1.

In the present embodiment, the flat region 27 denotes a region in which a distance from each position in the flat region 27 to a straight line connecting terminal boundaries is 300 μm or less when unevenness of the flat region 27 is viewed in an optional cross section. The unevenness of the flat region 27 is measurable with a surface roughness tester or an interelectronic force microscope (AFM).

The straight-line region 21 on the major cutting edge 15 in the drill 1 shown in FIG. 6 is located close to the rotation axis X1, and an inner peripheral-side end portion thereof is connected to the connection edge 19. Thus, the straight-line region 21, whose cutting resistance is stable while cutting the workpiece, is located closer to the rotation axis X1, thereby making it possible to enhance cutting performance on a side of the major cutting edge 15 which is close to the rotation axis X1. It is consequently possible to more surely prevent the occurrence of the delamination and the uncut fibers.

Additionally, an outer peripheral-side end portion of the major cutting edge 15 is connected to the minor cutting edge 17, whereas the straight-line region 21 is away from the minor cutting edge 17. This prevents a decrease of the thickness at the outer peripheral-side end portion of the major cutting edge 15, making it possible to inhibit wear progress at the outer peripheral-side end portion of the major cutting edge 15 which is most susceptible to the wear progress.

A major rake angle of the major rake surface 9 is set to 15-30° in the drill 1 of the present embodiment. Within this range, the major cutting edge 15 cuts well, and the strength of the drill body 3 in the vicinity of the major cutting edge 15 is enhanced to inhibit fracture of the drill body 3.

The major rake surface 9 has the recessed region 29 being more recessed than the flute 7, thus making it possible to increase the rake angle on the flat region 27. Therefore, the workpiece is well cuttable by the major cutting edge 15. The flat region 27 and the flute 7 are smoothly connected to each other via the recessed region 29 located between the flat region 27 and the flute 7.

Although the width of the flat region 27 in the direction along the rotation axis X1 in a side view may decrease as going away from the rotation axis X1, the width of the flat region 27 in the direction along the rotation axis X1 in the side view increases as going away from the rotation axis X1 in the drill 1 of the present embodiment. Hence, the drill 1 of the present embodiment is capable of coping with changes in chip length, thereby further stabilizing the cutting resistance when cutting the workpiece by the straight-line region 21.

Furthermore, the flat regions 27 are away from the leading edge. In other words, the pair of flat regions 27 are away from the pair of minor cutting edges 17. When the minor cutting edge 17 are located at the leading edge, a region of the flute 7 which is extended along each of the minor cutting edges 17 becomes a minor rake surface with respect to the minor cutting edge 17. When the flat region 27 is connected to the minor cutting edge 17, the flat region 27 has the flat planar form, thereby making it difficult to increase a minor rake angle with respect to the minor cutting edge 17. Therefore, so-called burrs can occur in the workpiece. However, the flat region 27 is away from the minor cutting edge 17, and the region of the flute 7 which is extended along the minor cutting edge 17 becomes the minor rake surface with respect to the minor cutting edge 17, thereby ensuring that the major cutting edge 15 and the minor cutting edge 17 have a large rake angle. This minimizes the likelihood of occurrence of burrs in the cutting of the workpiece.

A terminal boundary 31 close to the outer periphery of the flat region 27 is located along the rotation axis X1, thus leading to a smooth connection between the flat region 27 and the flute 7 adjacent thereto. That is, the terminal boundary 31 close to the outer periphery of the flat region 27 and the rotation axis X1 are approximately parallel to each other, and there is no difference in level between the flat region 27 and the flute 7 adjacent thereto in the side view in FIG. 6. This makes it possible to prevent a chip flow from being hindered by the difference in level. In this situation, when a terminal boundary 32 close to the outer periphery of the recessed region 29 is located on an extension line of the terminal boundary 31 close to the outer periphery of the flat region 27, chips flowing along the terminal boundary 31 close to the outer periphery of the flat region 27 are continuously guided to the flute 7 along the terminal boundary 32 close to the outer periphery of the recessed region 29, thus leading to satisfactory chip discharge performance. Chips are apt to become longer when the workpiece is metal, even so, it is possible to enhance chip discharge performance. The satisfactory chip discharge performance is particularly obtainable in the cutting process when the workpiece is a laminate made up of a CFRP (carbon fiber reinforced plastic) material and metal.

Satisfactory chip discharge performance is ensured when a ratio (L2/L1) of length L2 corresponding to the terminal boundary 33 in the recessed region 29, which is connected to the flute 7 and is close to the rear end of the drill body 3, to length L1 of the straight-line region 21 is 1.1 to 1.8 in the side view.

Here, the length L2 corresponding to the terminal boundary 33 in the recessed region 29, which is connected to the flute 7 and is close to the rear end of the drill body 3, is a distance between a vertical line passing through an end of the terminal boundary 33 which is located close to the inner periphery with respect to a straight line passing through the straight-line region 21, and a vertical line passing through an end of the terminal boundary 33 which is located close to the outer periphery.

The minor cutting edges 17 are usable for cutting the fibers that remain without being cut during the cutting by the major cutting edges 15. Hence, the minor cutting edges 17 preferably have better cutting performance than the major cutting edges 15. In the present embodiment, the minor rake angle of the minor rake surface with respect to the minor cutting edges 17 is set to 20-35°. Thus, the remaining fibers can be cut well owing to the fact that the minor rake angle of the minor rake surface with respect to the minor cutting edges 17 is larger than the major rake angle of the major rake surface 9.

Although the drill 1 of the first embodiment has the pair of cutting edges 5, but without being limited thereto, the present invention is applicable to an embodiment having only one cutting edge, or alternatively, having three or more cutting edges.

The present invention is not limited to the drill 1 of the first embodiment. For example, the straight-line region of the first embodiment may be an isogonal region whose major angle is constant, and the isogonal region may be made in a concave curvilinear shape (not shown) instead of the straight-line region. In a second embodiment having the isogonal region, a difference in major rake angle at individual positions of the isogonal region is within 10°, preferably within 3°. Even in this case, cutting performance in the isogonal region is stable, thus leading to stable cutting resistance when cutting the workpiece. It is consequently possible to inhibit the occurrence of the delamination and the uncut fibers, thereby ensuring that a satisfactory finished state is obtainable in the cutting process of the workpiece.

<Method of Manufacturing Machined Product>

Figure 11:
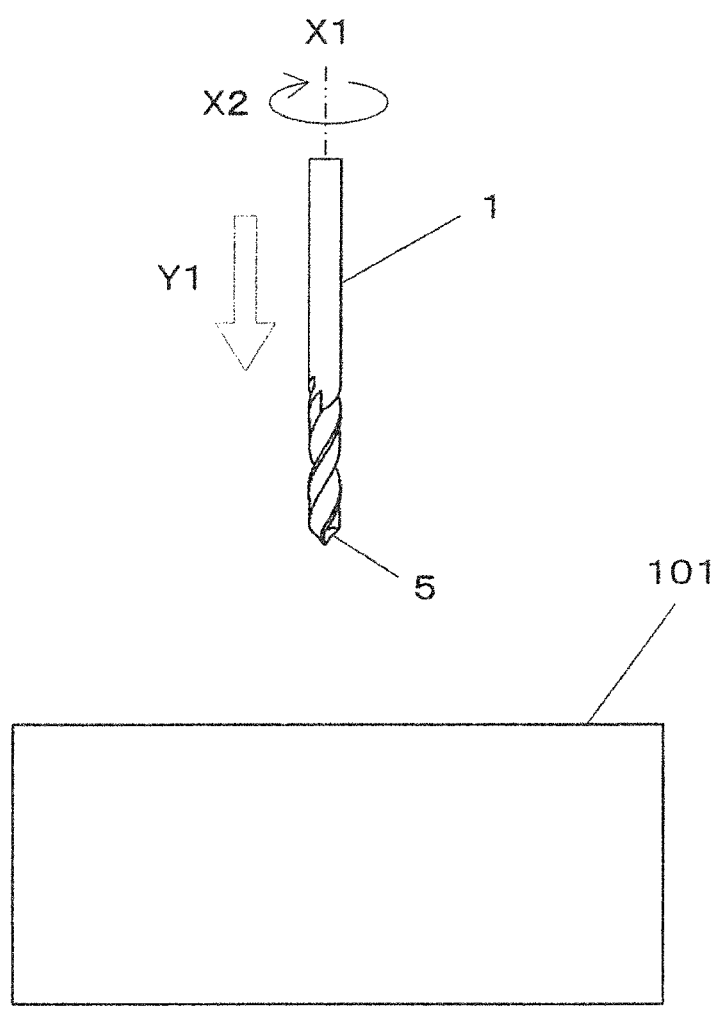
FIG. 11 is a schematic diagram that shows a step of a method of manufacturing a machined product according to an embodiment of the present invention.
Figure 12:
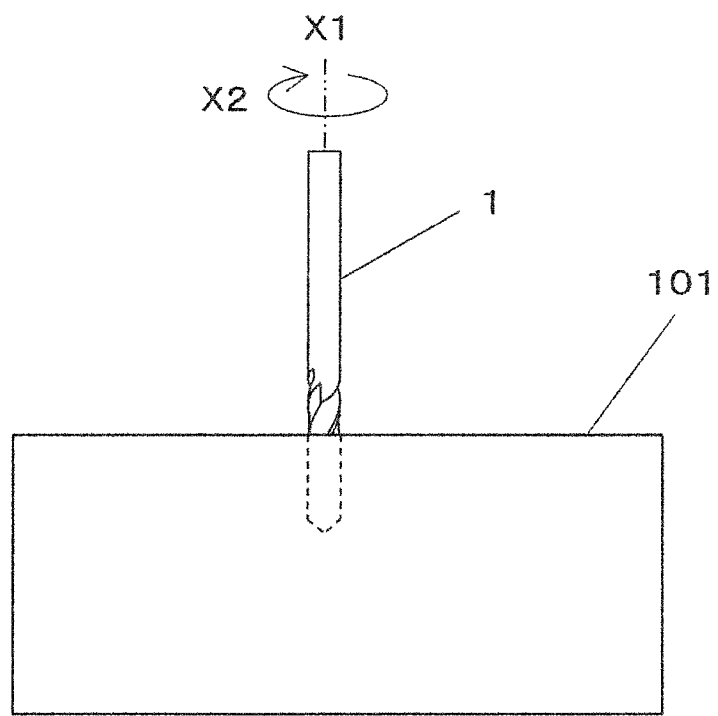
FIG. 12 is a schematic diagram that shows a step of the method of manufacturing a machined product according to the embodiment of the present invention.
Figure 13:
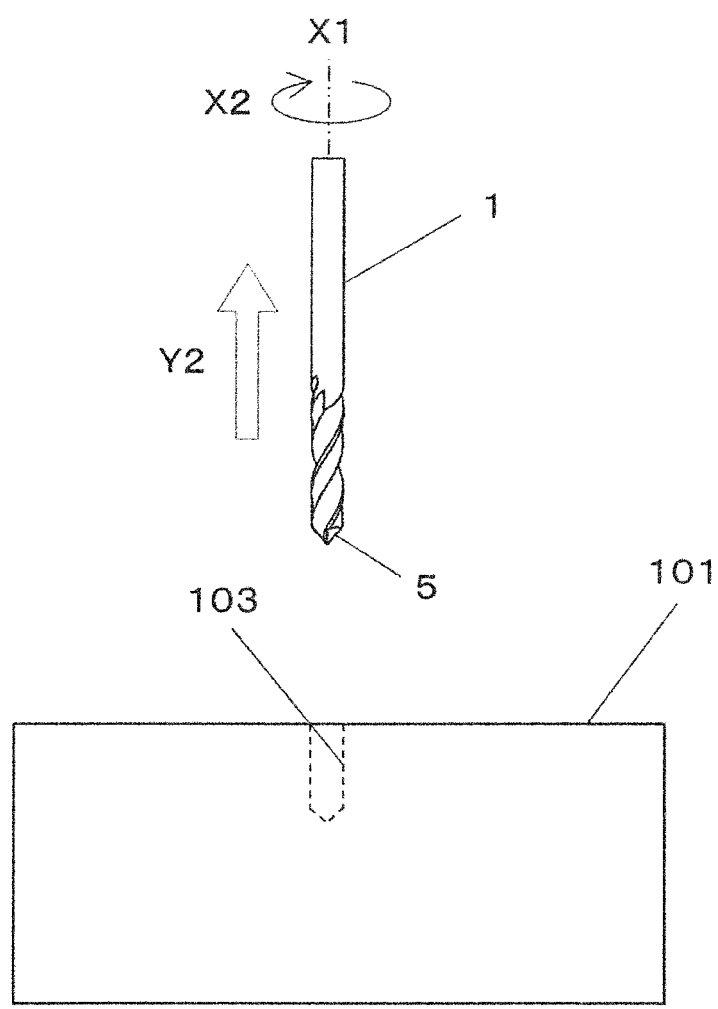
FIG. 13 is a schematic diagram that shows a step of the method of manufacturing a machined product according to the embodiment of the present invention.

A method of manufacturing a machined product according to the present embodiment is described in detail below, taking as an example the case of using the drill 1 according to the present embodiment. The following description is given with reference to FIGS. 11 to 13. In FIGS. 11 to 13, the part of the drill 1 which is located close to the rear end of the holding section 11 is omitted.

The method of manufacturing a machined product according to the present embodiment includes the following steps (1) to (4).

(1) This is the step of disposing the drill 1 above a prepared workpiece 101 (refer to FIG. 11).

(2) This is the step of bringing the drill 1 near the workpiece 101 in direction Y1 by rotating the drill 1 in the arrowed direction X2 around the rotation axis X1 (refer to FIGS. 11 and 12).

This step may be carried out by, for example, fixing the workpiece 101 onto a table of a machine tool having the drill 1 attached thereto, and then bringing the drill 1 being rotated near the workpiece 101. In this step, the workpiece 101 and the drill 1 need to be brought near each other. For example, the workpiece 101 may be brought near the drill 1.

(3) This is the step of forming a drilled hole 103 (through hole) in the workpiece 101 by bringing the drill 1 nearer the workpiece 101 so that the pair of major cutting edges 15 of the drill 1 being rotated are brought into contact with a desired position of a surface of the workpiece 101 (refer to FIG. 12).

In this step, in addition to the major cutting edges 15, the connection edge 19 and the pair of minor cutting edges 17 are also brought into contact with the desired position of the surface of the workpiece 101.

In this step, from the viewpoint of obtaining a satisfactory machined surface, it is preferable to make setting so that a partial region of the cutting section 13 of the drill 1 which is close to the rear end thereof does not penetrate the workpiece 101. That is, excellent chip discharge performance is producible via this region by making the partial region function as a region for discharging chips.

(4) This is the step of separating the drill 1 from the workpiece 101 in the direction Y2 (refer to FIG. 13).

Also in this step, the workpiece 101 and the drill 1 need to be separated from each other as in the case with the above step (2). For example, the workpiece 101 may be separated from the drill 1.

The excellent drilling performance is producible through the foregoing individual steps.

When the cutting process of the workpiece 101 as described above is carried out a plurality of times, for example, when a plurality of drilled holes 103 are formed in the single workpiece 101, it is necessary to repeat the step of bringing the major cutting edges 15 of the drill 1 into contact with different locations of the workpiece 101 while keeping the drill 1 rotating.

While the several embodiments of the present invention have been described and illustrated above, the present invention is not limited thereto. It is, of course, possible to make any optional ones insofar as they do not depart from the gist of the present invention.

DESCRIPTION OF REFERENCE NUMERALS 1 drill
3 drill body
5 cutting edge
7 chip discharge flute (flute)
9 major rake surface
11 holding section
13 cutting section
15 major cutting edge
17 minor cutting edge
19 connection edge
21 straight-line region
23 margin 25 body clearance
27 flat region
29 recessed region
101 workpiece
103 drilled hole (through hole)
X1 rotation axis

What is claimed is:

1. A drill, comprising:
   a bar-shaped drill body;
   a major cutting edge which is located at a front end of the drill body and has a straight-line region in a front view;
   a minor cutting edge which is adjacent to the major cutting edge and is located closer to the rear end of the drill body than the major cutting edge;
   a chip discharge flute which is located along an outer periphery of the drill body and is extended spirally around a rotation axis of the drill body in a direction from behind the major cutting edge toward a rear end of the drill body; and
   a major rake surface located between the major cutting edge and the chip discharge flute and along the major cutting edge,
   wherein the major rake surface is spaced apart from the minor cutting edge and comprises:
      a flat region located along the straight-line region and
      a recessed region which is located between the flat region and the chip discharge flute and is more recessed than the chip discharge flute,
      wherein the recessed region is connected to the chip discharge flute and comprises a curved surface.

2. The drill according to claim 1, wherein
   a width of the recessed region in a direction along the rotation axis in a side view decreases as going away from the rotation axis.

3. The drill according to claim 1, wherein
   a width of the flat region in the direction along the rotation axis in a side view increases as going away from the rotation axis.

4. The drill according to claim 1, wherein
   the straight-line region is located on a side of the major cutting edge which is close to the rotation axis.

5. The drill according to claim 1, wherein
   a major rake angle in the major rake surface is 15-30°.

6. The drill according to claim 1,
   wherein the flat region is away from the minor cutting edge.

7. The drill according to claim 5, further comprising
   a minor rake surface between the minor cutting edge and the chip discharge flute,
   wherein a minor rake angle in the minor rake surface is larger than the major rake angle.

8. The drill according to claim 1, wherein
   a first terminal boundary close to an outer periphery of the flat region is located along the rotation axis, and is smoothly connected to the chip discharge flute.

9. The drill according to claim 8, wherein
   a second terminal boundary close to an outer periphery of the recessed region is located on an extension line of the first terminal boundary.

10. The drill according to claim 1, wherein
    a ratio (L2/L1) of length L2 corresponding to a third terminal boundary in the recessed region, which is connected to the chip discharge flute and is located closer to the rear end of the drill body than the major cutting edge, to length L1 of the straight-line region is 1.1 to 1.8 in a side view.

11. A method of manufacturing a machined product, comprising:
    rotating a drill according to claim 1 around the rotation axis;
    bringing the major cutting edge of the drill being rotated into contact with a workpiece; and
    separating the drill from the workpiece.

12. A drill, comprising:
    a bar-shaped drill body;
    a major cutting edge which is located at a front end of the drill body and has a straight-line region in a front view;
    a minor cutting edge which is adjacent to the major cutting edge and is located closer to the rear end of the drill body than the major cutting edge;
    a chip discharge flute which is located along an outer periphery of the drill body and is extended spirally around a rotation axis of the drill body in a direction from behind the major cutting edge toward a rear end of the drill body; and
    a major rake surface located between the major cutting edge and the chip discharge flute and along the major cutting edge,
    wherein the major rake surface is spaced apart from the minor cutting edge and comprises a flat region located along the straight-line region.

13. The drill according to claim 12, wherein
    the major rake surface comprises a recessed region which is located between the flat region and the chip discharge flute and is more recessed than the chip discharge flute.

14. The drill according to claim 13, wherein
    a width of the recessed region in a direction along the rotation axis in a side view decreases as going away from the rotation axis.

15. The drill according to claim 12, wherein
    a width of the flat region in the direction along the rotation axis in a side view increases as going away from the rotation axis.

16. The drill according to claim 12, wherein
    the straight-line region is located on a side of the major cutting edge which is close to the rotation axis.

17. The drill according to claim 12, wherein
    a major rake angle in the major rake surface is 15-30°.

18. The drill according to claim 12, wherein
    the flat region is away from the minor cutting edge.

19. The drill according to claim 17, further comprising
    a minor rake surface between the minor cutting edge and the chip discharge flute,
    wherein a minor rake angle in the minor rake surface is larger than the major rake angle.

20. The drill according to claim 13, wherein
    a ratio (L2/L1) of length L2 corresponding to a third terminal boundary in the recessed region, which is connected to the chip discharge flute and is located closer to the rear end of the drill body than the major cutting edge, to length L1 of the straight-line region is 1.1 to 1.8 in a side view.

* * * * *